US012674666B2

(12) United States Patent
Bond

(10) Patent No.: US 12,674,666 B2
(45) Date of Patent: Jul. 7, 2026

(54) STRING LINE APPARATUS

(71) Applicant: Beyond CenterLine Solutions LLC,
Colorado Springs, CO (US)

(72) Inventor: Richard Michael Bond, Colorado
Springs, CO (US)

(73) Assignee: Beyond CenterLine Solutions LLC,
Colorado Springs, CO (US)

( * ) Notice: Subject to any disclaimer, the term of this
patent is extended or adjusted under 35
U.S.C. 154(b) by 715 days.

(21) Appl. No.: 18/055,711

(22) Filed: Nov. 15, 2022

(65) Prior Publication Data

US 2024/0159531 A1 May 16, 2024

(51) Int. Cl.
*G01C 15/10* (2006.01)

(52) U.S. Cl.
CPC .................................... *G01C 15/10* (2013.01)

(58) Field of Classification Search
CPC ................................ G01C 15/10; G01C 15/02
See application file for complete search history.

(56) References Cited

U.S. PATENT DOCUMENTS

| | | | | |
|---|---|---|---|---|
| 1,227,722 A | | 5/1917 | Wills | |
| 2,475,745 A | * | 7/1949 | Humlegard | G01C 15/10 |
| | | | | 33/393 |
| 3,250,009 A | * | 5/1966 | Oseka | E04G 21/1833 |
| | | | | 433/22 |
| 4,863,137 A | * | 9/1989 | Cockman | E04H 12/2223 |
| | | | | 52/157 |
| 4,924,579 A | * | 5/1990 | Berendsen | E04G 21/1833 |
| | | | | 33/1 LE |

| | | | | |
|---|---|---|---|---|
| 5,492,294 A | * | 2/1996 | Haeussler | F16B 7/0493 |
| | | | | 248/300 |
| 6,007,285 A | * | 12/1999 | Sisto | F16B 13/08 |
| | | | | 411/340 |
| 6,666,625 B2 | | 12/2003 | Thornton | |
| 6,817,107 B1 | * | 11/2004 | Rabalais, Jr. | E04G 21/1833 |
| | | | | 33/405 |

(Continued)

FOREIGN PATENT DOCUMENTS

| | | |
|---|---|---|
| DE | 1475066 A1 | 8/1969 |
| EP | 1798358 B1 | 11/2018 |
| JP | 1030621 A | 2/1998 |

OTHER PUBLICATIONS

Lepu Medical Technology "Humeral Intermediary Nail" Sep. 24, 2022, Available at: https://www.medicalexpo.com/prod/lepu-medical-technology/product-95737-1020057.html].

*Primary Examiner* — Yaritza Guadalupe-Mccall
(74) *Attorney, Agent, or Firm* — Briggs IP; Jeremy A. Briggs

(57) ABSTRACT

A string line apparatus is disclosed. The apparatus may include a cylindrical elongated member having an elongated member body, an elongated member proximal end and an elongated member distal end. The elongated member may be shaped as a nail or a screw. The apparatus may further include one or more protruding arms that may be perpendicularly attached to the elongated member body. Each protruding arm may include an arm body, an arm proximal end and an arm distal end. An arm proximal end diameter may be greater than an arm body diameter. The apparatus may further include a fastener configured to removably attach to the elongated member body via the elongated member distal end.

14 Claims, 7 Drawing Sheets

(56)                    References Cited

U.S. PATENT DOCUMENTS

| | | | |
|---|---|---|---|
| 7,779,546 B2 * | 8/2010 | Bond ..................... | G01C 15/02 33/409 |
| 8,166,624 B2 * | 5/2012 | Andreasen ............. | B25B 31/00 29/270 |
| 8,966,774 B2 * | 3/2015 | Choi ..................... | G01C 15/04 33/1 G |
| 11,679,620 B2 * | 6/2023 | Galvan ................... | B44D 3/38 33/414 |
| 2006/0070249 A1 * | 4/2006 | Wallach ................ | G01C 15/02 33/1 G |
| 2024/0159531 A1 * | 5/2024 | Bond ..................... | G01C 15/10 |

* cited by examiner

STRING LINE APPARATUS

TECHNICAL FIELD

The present disclosure relates to a string line apparatus, and more specifically to a string line apparatus that facilitates a user to tie string lines between reference points on a surface.

BACKGROUND

A user involved in carpentry, construction or masonry generally uses a string line to create a straight link between two reference points. The user typically ties the string line between two vertical posts and/or nails to keep the string line straight and stretched. For example, the user may use a construction stake and nails to tie the string line.

In a conventional construction stake-and-nail arrangement, the user may be required to insert a nail end (e.g., a sharp nail end) into stake through-holes and bend the nail end to lock the nail in the stake. Locking the nail in the stake ensures that the nail does not come out when the user ties the string line to the nail and performs the construction job. The user may further bend the nail end to its original position to unlock and remove the nail from the stake, when the user completes the construction job.

The process of bending the nail end for locking or unlocking the nail is generally tedious and may cause inconvenience to the user.

Thus, there is a need for an apparatus that facilities the user to conveniently tie the string line to a nail, without requiring to bend the nail end.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
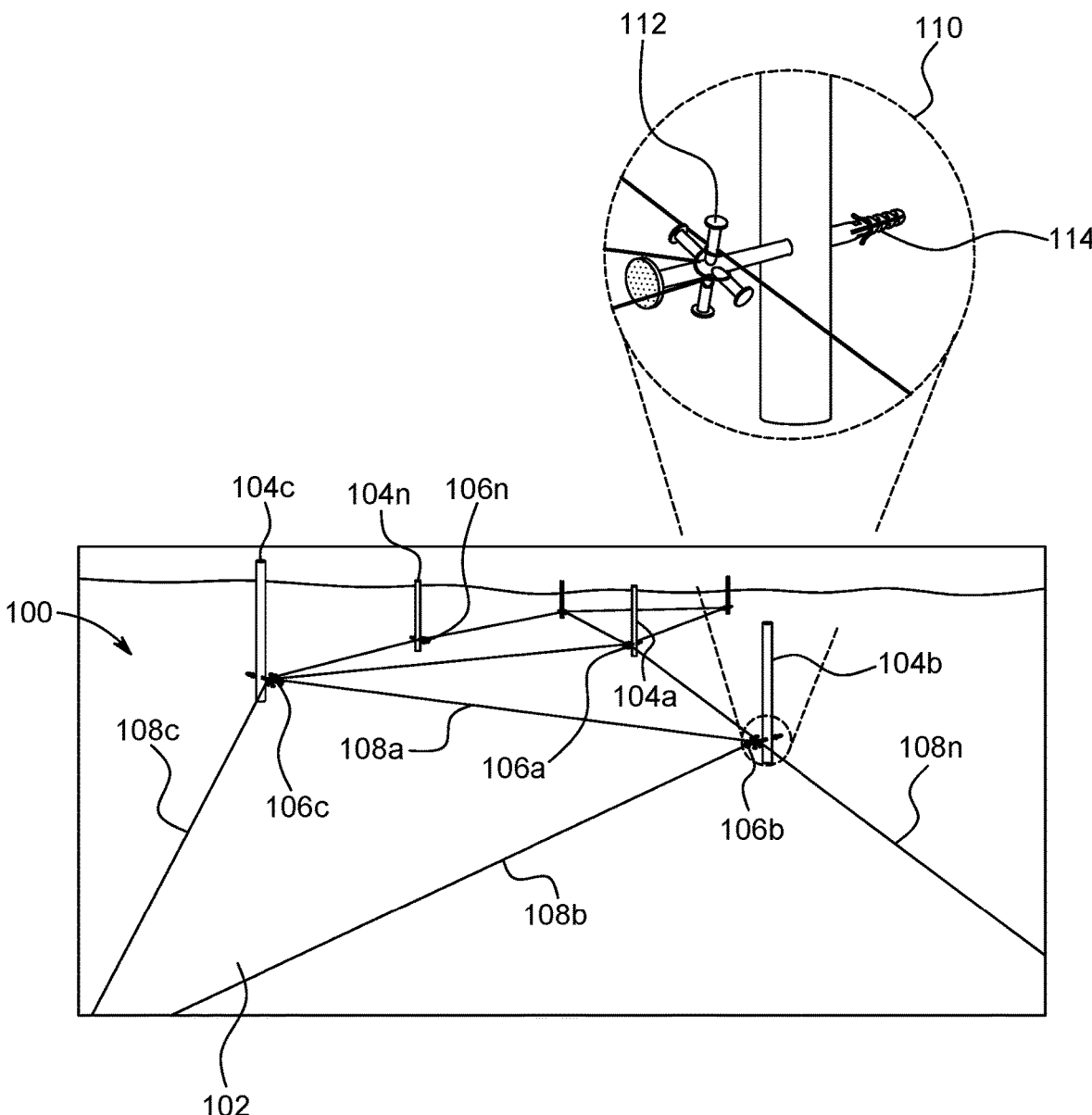
FIG. 1 depicts an example environment in which techniques and structures for providing the systems and methods disclosed herein may be implemented.

The present disclosure is directed towards a string line apparatus that may enable a user to tie string lines between two reference points on a surface. The surface may be, for example, a construction site, furniture, ground, and/or the like. The apparatus may include a cylindrical elongated member that may be shaped as a nail or a screw. The apparatus may further include one or more protruding arms that may be perpendicularly attached to the elongated member. The protruding arms too may be shaped as nails, with flattened nail heads. The user may affix the apparatus on the surface or a construction stake, and may tie string lines to the protruding arms.

The elongated member may include an elongated member main body, an elongated member proximal end, and an elongated member distal end. In some aspects, an elongated member main body portion may be threaded. The elongated member proximal end may be a nail head or a screw head, and the elongated member distal end may be a sharp or a pointed end.

The apparatus may further include a fastener that may be configured to removably attach to the elongated member main body via the elongated member distal end. The fastener may be, for example, a collar clamp, a collet, a wall anchor, a wing nut, and/or the like. The fastener may facilitate the user to lock the apparatus in the construction stake, when the user ties the string lines to the apparatus (specifically to the protruding arms) and performs a construction job.

In some aspects, the apparatus may further include an L-shaped bracket. The L-shaped bracket may include a first surface and a second surface perpendicularly attached to each other via an intersection edge. The elongated member distal end may be welded to the intersection edge such that an elongated member longitudinal axis may be parallel to the intersection edge. In other aspects, the elongated member distal end may be welded to the intersection edge such that the elongated member longitudinal axis may be perpendicular to the intersection edge.

The present disclosure discloses a string line apparatus that facilitates a user to conveniently use the apparatus in conjunction with a construction stake for tying string lines, without having to bend a nail end (or an apparatus end) to lock the apparatus in the construction stake. For example, the user may use the fastener to lock the apparatus in the construction stake, thus alleviating the need to bend the nail end. Further, nail-shaped protruding arms (specifically the flattened nail heads) ensure that string line knots (or the string lines) are not untied or come out when the user tightly ties the string lines to the protruding arms. Furthermore, the apparatus with the L-shaped bracket may facilitate the user to use the apparatus when the user desires to tie string lines to a corner edge of a surface, e.g., a corner edge of furniture.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a construction site or ground 102 on which one or more vertical posts 104*a*, 104*b*, 104*c*, 104*n* may be placed. In an exemplary aspect, the vertical posts 104*a*, 104*b*, 104*c*, 104*n* may be construction stakes (hereinafter referred to as stakes 104) and the ground 102 may be a surface on which a user (e.g., a construction worker, a mason, etc., not shown) may perform a construction job. The construction job may include, for example, building a ramp or cycling/jogging track, building a wall, installing floor tiles, surveying construction site, applying concrete, and/or the like.

In some aspects, the stakes 104 may be standard or conventional construction stakes that may be made of plastic or metals such as iron, steel, aluminum, copper, and/or the like. Each stake 104 may be cylindrical or cuboidal in shape and may include a sharp end or blade (not shown) using which the user may insert the stake into the ground 102 and place the stake 104 vertically on the ground 102, as shown in FIG. 1. Further, each stake 104 may include one or more through-holes (not shown) that may be aligned along a stake 104 width or diameter. The user may use the through-holes to insert an elongated object, e.g., a nail or a screw, through the stake 104 width or diameter. The through-holes may be present in a stake 104 portion or throughout a stake 104 length.

In an exemplary aspect, the user may insert one or more string line apparatuses 106*a*, 106*b*, 106*c*, 106*n* (collectively referred to as apparatuses 106) through respective stake 104. For example, the string line apparatus 106*a* may be inserted into the stake 104*a*, the string line apparatus 106*b* may be inserted into the stake 104*b*, and/or the like. In some aspects, the string line apparatus 106 may be inserted into the stake 104 via the through-holes. The user may tie string lines 108*a*, 108*b*, 108*c*, 108*n* (collectively referred to as string lines 108) between the apparatuses 106 to create straight lines, as shown in FIG. 1. For example, the user may insert the apparatus 106*b* into the stake 104*b* (via the stake 104*b* through-holes) and may tie one end of the string line 108*a* to the apparatus 106*b*, as shown in view 110. The user may tie another end of the string line 108*a* to the apparatus 106*c* to create a straight line/link between the stakes 104*b* and 104*c*.

A person ordinarily skilled in the art may appreciate that an operator (e.g., the user) working on a construction site typically creates straight lines between two references points to form a shortest line path or a straight-line path between the references points. The straight-line path may assist the user in accurately measuring distance, applying concrete, forming a straight track, etc. between the reference points.

In some aspects, the apparatus 106 may be a nail or a screw that may be made of metal such as iron, steel, aluminum, and/or the like. The apparatus 106 may have one or more protruding arms 112 on which the user may tie the string line 108. The arms 112 may be attached perpendicularly to apparatus 106 body (e.g., the nail or screw body/shank). The apparatus 106 may further include a fastener 114 using which the user may fasten the apparatus 106 to the stake 104. The fastener 114 may ensure that the apparatus 106 does not come out from the stake 104 via the though-holes when the user tightly ties the string line 108 to the apparatus 106. Apparatus 106 structural details may be understood in conjunction with FIGS. 2-4.

Although FIG. 1 depicts the apparatus 106 being inserted into the stake 104, in some aspects (not shown), the user may directly insert the apparatus 106 to the ground 102 and tie the string line 108 between the apparatuses 106.

Further, although not depicted in FIG. 1, in some aspects, the user may insert the apparatuses 106 on a surface, e.g., furniture surface, and tie the string line 108 between the apparatuses 106. In this case, the user may use the apparatus 106 to create straight lines between two references points on furniture or wood, when the user performs a carpentry job. The environment 100 depicted in FIG. 1 should not be construed as limiting the present disclosure scope to construction jobs. The apparatus 106 may be used in different applications where creation of straight lines may be required using string lines.

Figure 2:
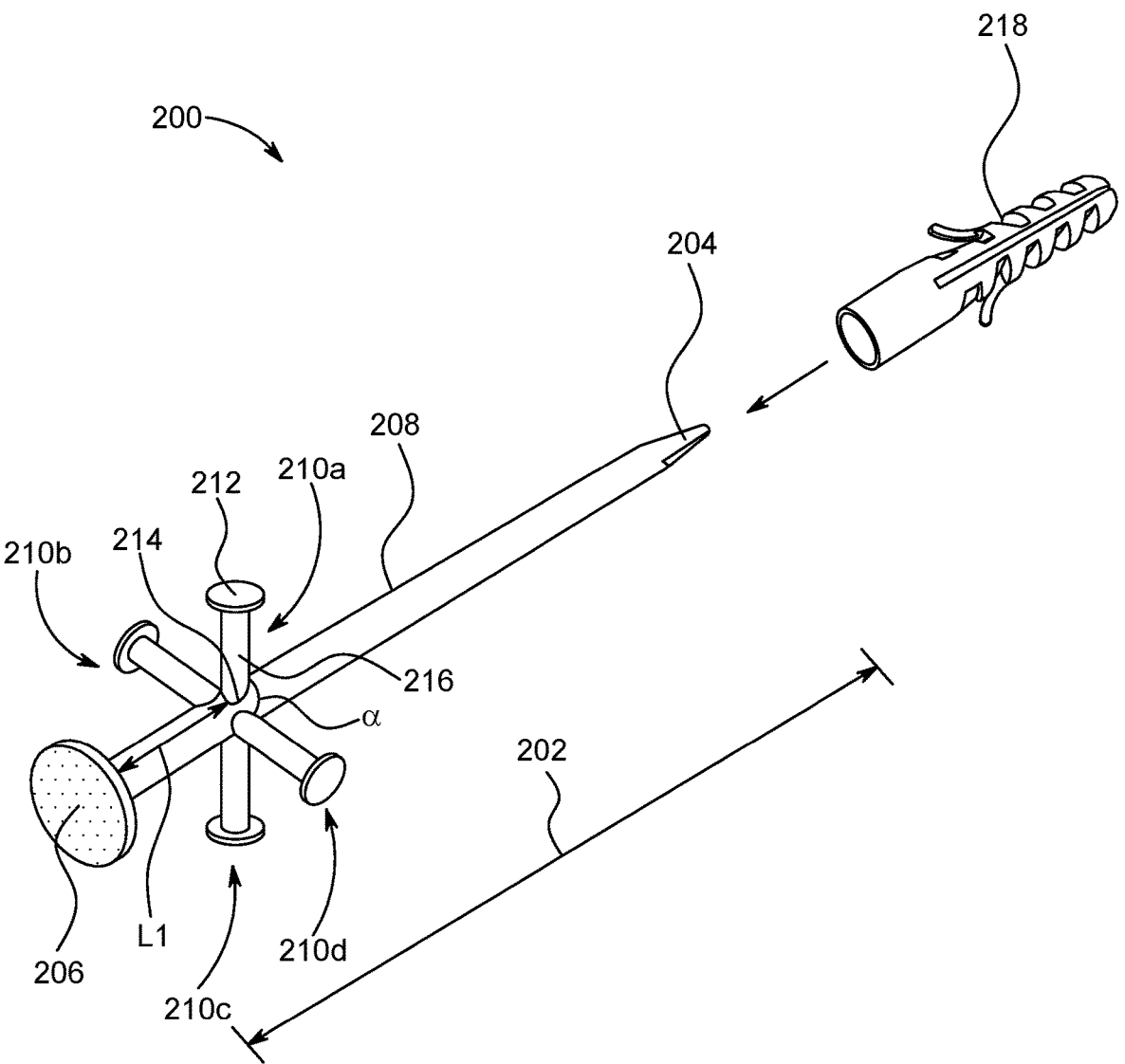
FIG. 2 depicts an isometric view of an example string line apparatus in accordance with the present disclosure.

FIG. 2 depicts an isometric view of an example string line apparatus 200 in accordance with the present disclosure. The apparatus 200 may be same as or similar to the apparatus 106.

The apparatus 200 may include an elongated cylindrical member 202 (or a member 202). The member 202 may be a nail, as shown in FIG. 2. In an exemplary aspect, the member 202 may be a 4-penny, an 8-penny or a 16-penny nail. Stated another way, the member 202 may have a length of 1.5, 2.5 or 3.5 inches. The member 202 may have other lengths as well, without departing from the present disclosure scope. In other aspects, the member 202 may have a shape of a cuboid. In additional aspects (not shown), the member 202 may be a double-headed or a duplex nail. Further, the member 202 may be made of metal such as iron, steel, aluminum, and/or the like, and may be coated with an anti-rust coating (e.g., coating with Zinc) on a member 202 exterior surface so that the member 202 may not rust.

The member 202 may include a member distal end 204, a member proximal end 206 and a member main body 208 (or a nail shank). The member proximal end 206 may be a nail head with a flat top surface. The member distal end 204 may include a sharp or pointed end. Specifically, a member proximal end 206 diameter may be greater than a member main body 208 diameter, and a member distal end 204 diameter may be less than the member main body 208 diameter. For example, if the member 202 is a 16-penny nail, the member main body 208 diameter (i.e., the shank diameter) may be in a range of 0.16 to 0.17 inches, and the member proximal end 206 diameter (i.e., the nail head diameter) may be in a range of 0.3 to 0.4 inches. If the member 202 is an 8-penny nail, the member main body 208 diameter may be in a range of 0.13 to 0.14 inches, and the member proximal end 206 diameter may be in a range of 0.25 to 0.3 inches.

The member distal end 204 may have a tapered shape such that the member distal end 204 may form a shape of a cone or a funnel with a sharp or pointed end, as shown in FIG. 2.

The apparatus 200 may further include one or more protruding arms 210*a*, 210*b*, 210*c*, 210*d* (hereinafter referred to as a protruding arm 210) that may be attached perpendicularly to the member main body 208. Specifically, a protruding arm 210 longitudinal axis may be perpendicular to a member main body 208 longitudinal axis. In other aspects (not shown in FIG. 2), the protruding arm 210 longitudinal axis may be disposed at different angles (e.g., 45 or 60 degrees) relative to the member main body 208 longitudinal axis.

In an exemplary aspect, the protruding arm 210 may be shaped as an elongated cylinder or a cuboid, and may be made of same or similar material as the member 202. For example, the protruding arm 210 may be made of metal such iron, steel, aluminum, and/or the like. Further, the protruding arm 210 may be coated with the anti-rust coating on a protruding arm 210 exterior surface.

Similar to the member 202, the protruding arm 210 may be shaped as a nail. A protruding arm 210 length may be less than a member 202 length. In an exemplary aspect, the protruding arm 210 may be a 4-penny or a 6-penny nail. For example, the protruding arm 210 may be a 4-penny nail when the member 202 is a 6-penny nail. Further, the protruding arm 210 may be a 6-penny nail when the member 202 is an 8-penny or a 16-penny nail. The dimensions mentioned here are for illustrative purpose only, and should not be construed as limiting the present disclosure scope. The apparatus 200 may have the member 202 and/or the protruding arm 210 of different dimensions (and/or materials) than the ones described in the present disclosure. Further, each protruding arm 210 may have same or different lengths.

Each protruding arm 210 may include an arm proximal end 212, an arm distal end 214, and an arm body 216. The arm proximal end 212 may be shaped as a nail head. Stated another way, an arm proximal end 212 diameter may be greater than an arm body 216 diameter. Further, as shown in FIG. 2, the arm distal end 214 may be attached to the member main body 208. In some aspects, the arm distal end 214 may be welded to the member main body 208 or attached via adhesives. In this case, the arm distal end 214 may or may not have a sharp or a pointed end.

Each protruding arm 210 may be attached to the member main body 208 at a predefined distance "L1" from the member proximal end 206. In an exemplary aspect, the distance "L1" may be in a range of 20 to 30% of a member main body 208 length (or a nail shank length). Further, as shown in FIG. 2, the apparatus 200 may include four protruding arms 210 that may be perpendicularly attached to the member main body 208. Stated another way, the longitudinal axis of each protruding arm 210 may be perpendicular to the member main body 208 longitudinal axis. Further, the longitudinal axis of each protruding arm may be disposed at a predefined angle "α" from the longitudinal axis of adjacent protruding arms. For example, as shown in FIG. 2, a protruding arm 210a longitudinal axis may be disposed at an angle of 90 degrees from a protruding arm 210d longitudinal axis. Stated another way, the apparatus 200 may include four protruding arms 210 positioned at equal distance from the member proximal end 206, and are positioned perpendicular to each other. In other aspects, the four protruding arms 210 may be located at unequal distance from the member proximal end 206 (e.g., one protruding arm may be located at 0.2 inches from the member proximal end 206 and another protruding arm may be located at 0.3 inches from the member proximal end 206). In further aspects, a distance between the protruding arms 210 may or may not be equal.

In other aspects, not shown in FIG. 2, the angle "α" may be different from 90 degrees. For example, the angle "α" may be 45 degrees or 60 degrees, without departing from the present disclosure scope. Further, although FIG. 2 depicts four protruding arms 210, in other aspects, the apparatus 200 may include more or less protruding arms. For example, the apparatus 200 may include two protruding arms disposed at the angle "α" of 180 degrees from each other. Alternatively, the apparatus 200 may include six, eight or more protruding arms.

The apparatus 200 may further include a fastener 218 that may be configured to be removably attached to the member main body 208 via the member distal end 204. Specifically, an apparatus user may insert the fastener 218 into the member main body 208 via the member distal end 204 so that some (or entire) part of fastener 218 body may engulf a portion of the member main body 208. In some aspects, fastener 218 may be a collar clamp, a collet, a wall anchor (as shown in FIG. 2), or any other similar fastener. The fastener 218 may facilitate the user to "lock" the apparatus

200 in a construction stake (not shown in FIG. 2), without having to bend the member distal end 204. An example embodiment of a user using the apparatus 200 is shown in FIG. 3.

Figure 3:
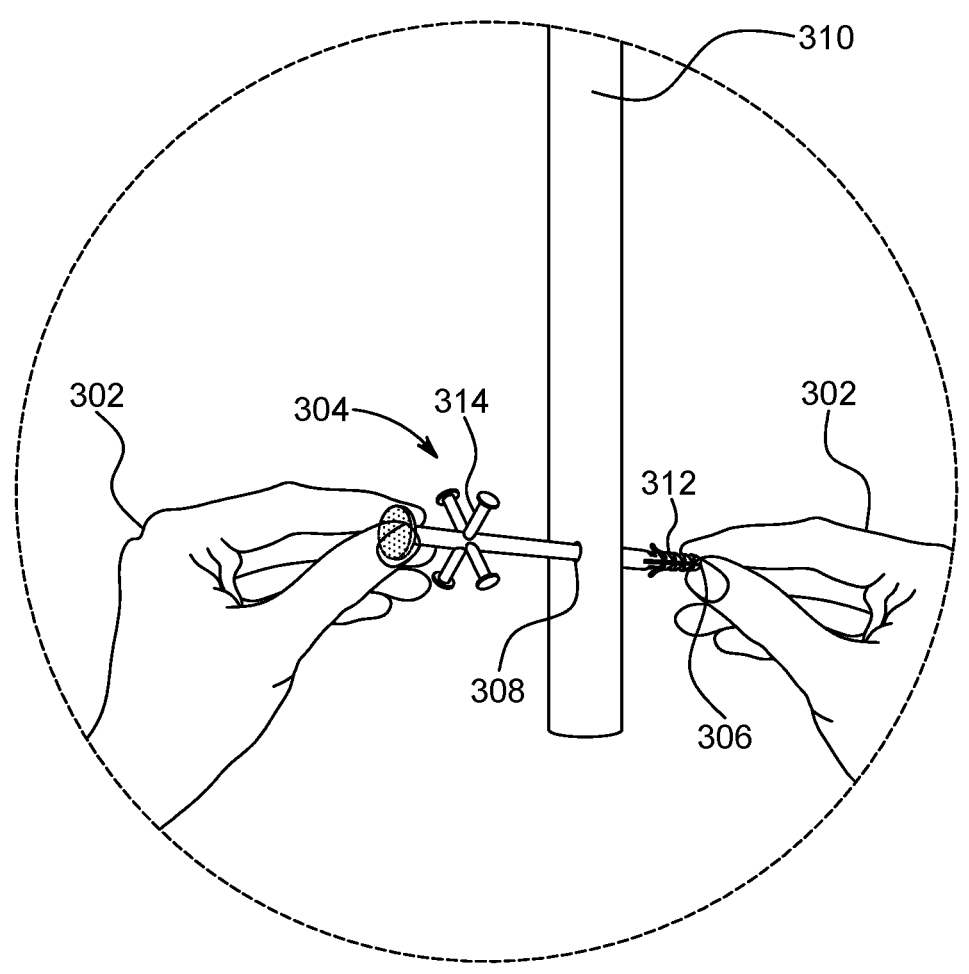
FIG. 3 depicts an example embodiment of a user using a string line apparatus in accordance with the present disclosure.

FIG. 3 depicts an example embodiment of a user 302 using a string line apparatus 304 in accordance with the present disclosure. The apparatus 304 may be same as the apparatus 200.

The user 302 may insert the apparatus 304 into a through-hole 308 of a construction stake 310 (same as the stake 104 described in conjunction with FIG. 1). In particular, the user 302 may insert the apparatus 304 into the stake 310 via an apparatus distal end 306. The user 302 may further use a fastener 312 (same as the fastener 218) to "lock" the apparatus 304 in the stake 310. In particular, the user 302 may insert the fastener 312 into the apparatus 304 via the apparatus distal end 306 to lock the apparatus 304 in the stake 310. The user 302 may additionally tie string lines (not shown) to one or more protruding arms 314 (same as the protruding arms 210) after or before the user 302 inserts the apparatus distal end 306 into the stake 310.

A person ordinarily skilled in the art may appreciate that by using the fastener 312, the user 302 may not be required to bend the apparatus distal end 306 to lock the apparatus 304 in the stake 310. Locking the apparatus 304 may ensure that the apparatus 304 does not come out of the through-hole 308 when the user 302 ties the string lines to the protruding arms 314 and performs the construction job. Further, since protruding arm 314 proximal ends (e.g., the arm proximal ends 212) are shaped as flattened nail heads, string line knots (or the string lines) may not get untied or come out of the protruding arms 314 when the user 302 performs the construction job. Stated another way, nail head-shaped proximal ends ensure that the string lines do not come out, when the user 302 tightly ties the string lines on the protruding arms 314.

Although FIG. 3 depicts the user 302 using the apparatus 304 in conjunction with the stake 310, in some aspects (not shown), the user 302 may not use the stake 310 and may directly insert the apparatus distal end 306 into the ground 102 or a surface (e.g., wood surface). In this case, the user 302 may use a hammer (or any other similar object) to push the apparatus distal end 306 into the ground 102/surface and removably affix the apparatus 304 to the ground 102/surface. The user 302 may tie the string lines to the protruding arms 314 when or after the user 302 affixes the apparatus 304 to the ground 102/surface. A person ordinarily skilled in the art may appreciate that the sharp or pointed shape of the apparatus distal end 306 may enable the user 302 to conveniently insert the apparatus 304 to the ground 102/surface. In this case, the user 302 may not require the fastener 312.

Figure 4:
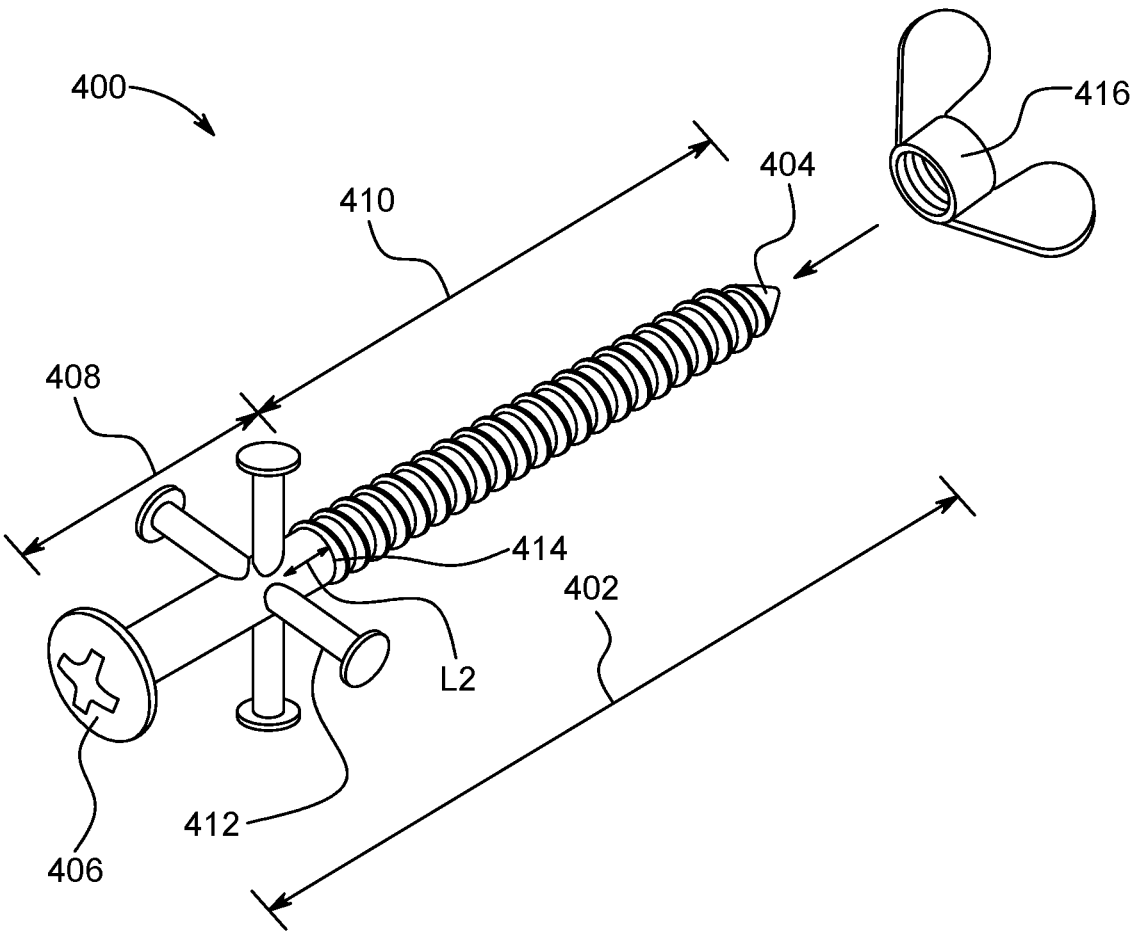
FIG. 4 depicts an isometric view of another example string line apparatus in accordance with the present disclosure.

FIG. 4 depicts an isometric view of another example string line apparatus 400 in accordance with the present disclosure. The apparatus 400 may be similar to the apparatus 200.

The apparatus 400 may include an elongated cylindrical member 402 (or a member 402). In some aspects, the member 402 may be shaped as a screw. Member 402 length and dimensions may be same as or equivalent to member 202 length and dimensions. Further, the member 402 may be made of same or similar material as the member 202, and the member 402 too may be coated with the anti-rust coating as the member 202.

The member 402 may include a member distal end 404, a member proximal end 406 and a member main body. The member proximal end 406 may be a screw head and the member distal end 404 may include a sharp or pointed end (similar to the member distal end 204). Diameter, dimensions and shape of the member proximal end 406 and the member distal end 404 may be same as or similar to the diameter, dimensions and shape of the member proximal end 206 and the member distal end 204, respectively. Therefore, for the sake of simplicity and conciseness, details of the member proximal end 406 and the member distal end 404 are not described here.

The member main body may include a first portion 408 and a second portion 410, as shown in FIG. 4. In some aspects, the second portion 410 may be a threaded portion. A second portion 410 length may be in a range of 30-75% of a main body length. Further, in some aspects, entire second portion 410 length may be threaded (as shown in FIG. 4). In other aspects, only a part of the second portion 410 length may be threaded.

The apparatus 400 may further include one or more protruding arms 412 that may be same as the protruding arms 210 (e.g., shaped as a nail with a flat top/proximal end). The protruding arms 412 (specifically protruding arm 412 distal ends) may be perpendicularly attached to the main body, and may be located in the first portion 408.

In some aspects, the protruding arms 412 may be attached to the main body at an intersection point 414 of the first portion 408 and the second portion 410 on the main body. In other aspects, the protruding arms 412 may be attached anywhere on the first portion 408 at a distance "L2" from the intersection point 414, as shown in FIG. 4. For example, the distance "L2" may be half of first portion 408 length.

In operation, a user (e.g., the user 302) may insert the member distal end 404 into a surface (e.g., a wood surface, construction stake etc.) and rotate the apparatus 400 to screw/affix the apparatus 400 to the surface. The user 302 may further tie the string lines to the protruding arms 412 when the user 302 affixes the apparatus 400 to the surface.

In some aspects, the apparatus 400 may further include a fastener 416 that may be removably attached to the second portion 410 via the member distal end 404. The fastener 416 may be, for example, a wing nut (as shown in FIG. 4), a cage nut, a flange nut, a swage nut, and/or the like. The user 302 may use the fastener 416 when the user 302 uses the apparatus 400 in conjunction with the stake 310. Specifically, the user 302 may use the fastener 416 to lock the apparatus 400 in the stake 310, as described above in conjunction with FIG. 3.

Figure 5:
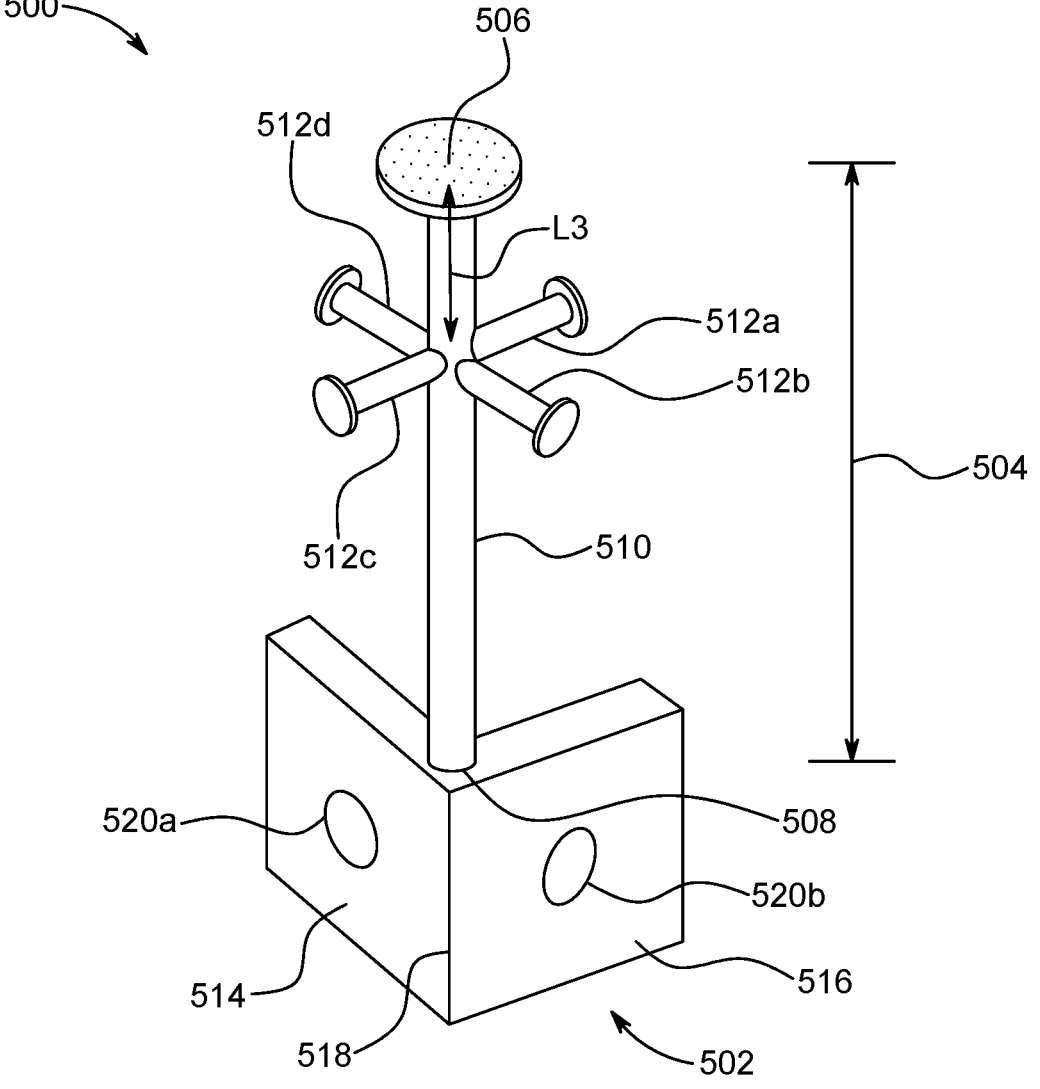
FIG. 5 depicts an isometric view of an example string line apparatus with an L-shaped bracket in accordance with the present disclosure.

FIG. 5 depicts an isometric view of an example string line apparatus 500 with an L-shaped bracket 502 in accordance with the present disclosure. The apparatus 500 may include an elongated member 504, which may be shaped as a cylinder or a cuboid. The member 504 may be same as or similar to the member 202. For example, the dimensions, shape and/or material of the member 504 may be same as that of member 202.

The member 504 may include a member proximal end 506, a member distal end 508 and a member main body 510. The member proximal end 506 may be shaped as a nail head (e.g., a flattened nail head). Stated another way, a member proximal end 506 diameter may be greater than a member main body 510 diameter.

The apparatus 500 may further include one or more (e.g., four) protruding arms 512a, 512b, 512c and 512d (collectively referred to as protruding arms 512). The protruding arms 512 may be perpendicularly attached to the member main body 510, at a predefined distance "L3" from the member proximal end 506. For example, the distance "L3" may be 25% of a member main body 510 length (or a nail shank length). The protruding arms 512 may be same as the protruding arms 210, and are not described again here for the sake of simplicity and conciseness.

The L-shaped bracket 502 may include a first surface 514 and a second surface 516 attached to each other via an intersection edge 518. The first surface 514 and the second surface 516 may be made of metal such as iron, steel, aluminum, and/or the like, and may be welded with each other at the intersection edge 518. The first surface 514 and the second surface 516 may be shaped as a rectangle or a square. In an exemplary aspect, the first surface 514 and the second surface 516 are square shaped with an edge length/dimension that may be in a range of 40-60% of the member main body 510 length (or the nail shank length). Further, a thickness of the first surface 514 and the second surface 516 may be same as or equivalent to a member main body 510 diameter (if the member 504 is shaped as a cylinder) or a member main body 510 width (if the member 504 is shaped as a cuboid). In some aspects, a first surface 514 dimensions may be same as a second surface 516 dimensions.

In some aspects, the first surface 514 and the second surface 516 may be welded together such that the first surface 514 may be perpendicular relative to the second surface 516. In other aspects (not shown in FIG. 5), the first surface 514 and the second surface 516 may be disposed at different angles relative to each other, e.g., at 45 degrees, 60 degrees, or the like.

The member distal end 508 may be attached or welded to the intersection edge 518. In some aspects, the member distal end 508 may be attached to an intersection edge 518 top portion or proximal end such that a member main body 510 longitudinal axis may be parallel to the intersection edge 518, as shown in FIG. 5.

In operation, the user may affix the first surface 514 and the second surface 516 to a corner portion or edge of an object (e.g., an edge of a furniture or wood, not shown) by using one or more through-holes 520a, 520b and nails or screws. Specifically, each surface 514, 516 may include one or more through-holes 520a, 520b through which the user may insert a nail, a screw or any other similar fastening means to affix the L-shaped bracket 502 to an object corner edge. The user may then tie string lines to the protruding arms 512 and perform construction or carpentry job, as described above in conjunction with FIGS. 2 and 3.

The through-holes 520a, 520b may be disposed anywhere on the first surface 514 and the second surface 516. For example, the through-holes 520a, 520b may be disposed at centers of the first and second surfaces 514, 516, or may be disposed towards top or bottom portions of the first and second surfaces 514, 516.

A person ordinarily skilled in the art may appreciate that the apparatus 500 facilitates the user to conveniently tie string lines from the object corner edge. The user may removably affix the L-shaped bracket 502 to the object corner edge when the user commences the construction or carpentry job, and may remove the bracket 502 from the corner edge when the job is finished. Further, by rotating L-shaped bracket 502 orientation, the user may align the member main body 510 (and hence the protruding arms 512) to point "upwards" or "downwards" relative to object surface, based on user's requirement. For example, the user may point the member main body 510 upwards when the user desires to tie string lines at an object top or upper surface, and may point the member main body 510 downwards when the user desires to tie string lines at an object bottom or underside surface.

Figure 6:
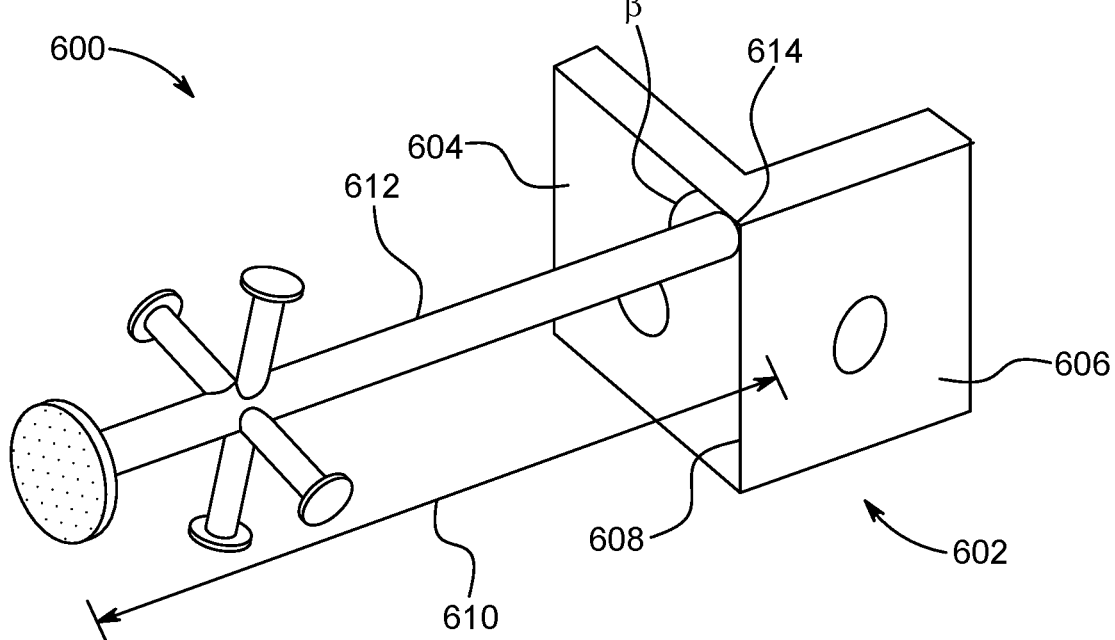
FIG. 6 depicts an isometric view of another example string line apparatus with an L-shaped bracket in accordance with the present disclosure.

FIG. 6 depicts an isometric view of another example string line apparatus 600 with an L-shaped bracket 602 in accordance with the present disclosure. The bracket 602 may be same as the bracket 502, and may include a first surface 604 and a second surface 606 that may be welded/attached with each other via an intersection edge 608.

The apparatus 600 may include an elongated member 610 that may be same as the member 504. The member 610 may include a member main body 612 and a member distal end 614. The member distal end 614 may be attached to the intersection edge 608 such a member main body 612 longitudinal axis may be perpendicular to one of the first surface 604 or the second surface 606. For example, as shown in FIG. 6, the member main body 612 longitudinal axis may form an angle "$\beta$" (which may be equal to 90 degrees) relative to the first surface 604.

Further, the member main body 612 longitudinal axis may be perpendicular to the intersection edge 608, as shown in FIG. 6. A person ordinarily skilled in the art may appreciate that the apparatus 600 differs from the apparatus 500 as the member main body 612 (and hence the member 610) is aligned "horizontally" with respect to the bracket 602 in the apparatus 600, while the member main body 510 is aligned "vertically" with respect to the bracket 502 in the apparatus 500. Based on user's requirement for string line attachment, the user may use the apparatus 500 or the apparatus 600.

Although FIG. 6 depicts the member distal end 614 being attached to an intersection edge 608 top portion or proximal end, in additional aspects (not shown), the member distal end 614 may be attached anywhere along intersection edge 608 length. For example, the member distal end 614 may be attached at a middle portion or a bottom/distal end of the intersection edge 608.

Remaining apparatus 600 elements are same as apparatus 500 elements, and hence are not described again here for the sake of simplicity and conciseness.

Figure 7:
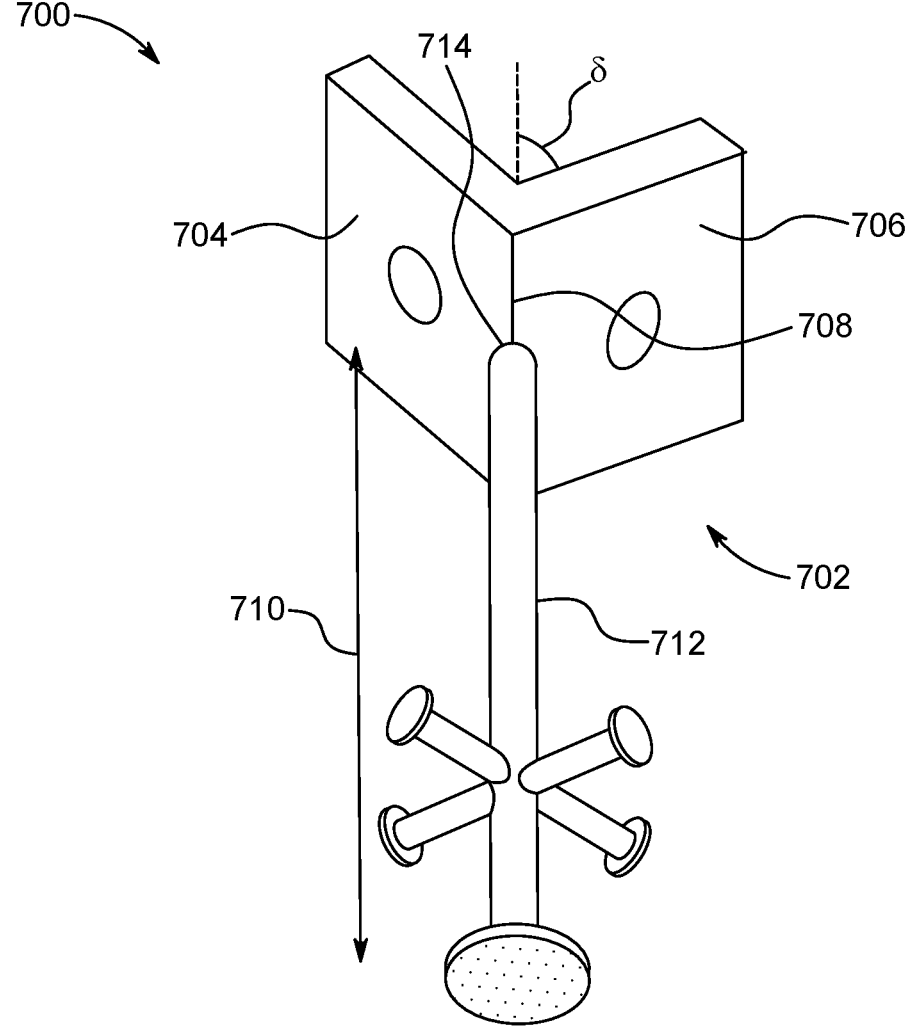
FIG. 7 depicts an isometric view of yet another example string line apparatus with an L-shaped bracket in accordance with the present disclosure.

FIG. 7 depicts an isometric view of yet another example string line apparatus 700 with an L-shaped bracket 702 in accordance with the present disclosure. The bracket 702 may be same as the bracket 502, 602, and may include a first surface 704 and a second surface 706 that may be welded/attached with each other via an intersection edge 708.

The apparatus 700 may include an elongated member 710 that may be same as the member 504, 610. The member 710 may include a member main body 712 and a member distal end 714. The member distal end 714 may be attached to the intersection edge 708 such that a member main body 712 longitudinal axis may be at an angle "$\delta$" with respect to the first surface 704 or the second surface 706, as shown in FIG. 7. In some aspects, the angle "$\delta$" may be 45 degrees. In other aspects, the angle "$\delta$" may be any other angle, e.g., 60 degrees or 75 degrees.

Further, the member main body 712 longitudinal axis may be perpendicular to the intersection edge 708, as shown in FIG. 7.

In some aspects, the member distal end 714 may be attached to an intersection edge 708 middle portion, as shown in FIG. 7. In other aspects, the member distal end 714 may be attached to a top or bottom portion of the intersection edge 708.

The remaining apparatus 700 elements are same as the apparatus 500 elements, and hence are not described again here for the sake of simplicity and conciseness.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus comprising:

a cylindrical elongated member having an elongated member body, an elongated member proximal end and an elongated member distal end;

a first protruding arm attached to the elongated member body at a first predefined angle relative to an elongated member body longitudinal axis;

a second protruding arm attached perpendicularly to the elongated member body, wherein a second protruding arm longitudinal axis is disposed at a second predefined angle relative to a first protruding arm longitudinal axis, and wherein the second predefined angle is 90 degrees; and a fastener configured to removably attach to the elongated member body via the elongated member distal end to lock the apparatus in a construction device.

2. The apparatus of claim 1, wherein the first predefined angle is 90 degrees.

3. The apparatus of claim 1, wherein an elongated member proximal end diameter is greater than an elongated member body diameter, and wherein an elongated member distal end diameter is less than the elongated member body diameter.

4. The apparatus of claim 1, wherein the first protruding arm comprises a first protruding arm body, a first protruding arm proximal end and a first protruding arm distal end.

5. The apparatus of claim 4, wherein the first protruding arm distal end is attached to the elongated member body.

6. The apparatus of claim 4, wherein a first protruding arm proximal end diameter is greater than a first protruding arm body diameter.

7. The apparatus of claim 1, wherein the first protruding arm is attached to the elongated member body at a predefined distance from the elongated member proximal end.

8. The apparatus of claim 7, wherein the predefined distance is in a range of 20 to 30% of an elongated member body length.

9. The apparatus of claim 1, wherein the elongated member body comprises a first portion and a second portion, and wherein the first protruding arm is attached to the first portion.

10. The apparatus of claim 9, wherein the second portion comprises a threaded portion.

11. The apparatus of claim 1, wherein the construction device is a construction stake.

12. An apparatus comprising:

a cylindrical elongated member having an elongated member body comprising a first portion and a second portion, wherein the second portion comprises a threaded portion;

a first protruding arm attached to the first portion at a predefined angle relative to an elongated member body longitudinal axis, wherein a first protruding arm proximal end diameter is greater than a first protruding arm body diameter; and a fastener configured to removably attach to the second portion to lock the apparatus in a construction device.

13. The apparatus of claim 12, wherein the first protruding arm comprises a first protruding arm body, a first protruding arm proximal end and a first protruding arm distal end, and wherein the first protruding arm distal end is attached to the first portion.

14. An apparatus comprising:

a cylindrical elongated member having an elongated member body comprising a first portion and a second portion;

a first protruding arm attached to the first portion at a predefined angle relative to an elongated member body longitudinal axis; and an L-shaped bracket attached to the second portion, wherein the L-shaped bracket comprises a first surface and a second surface attached perpendicularly to the first surface via an intersection edge, wherein an elongated member body longitudinal axis is perpendicular to the intersection edge.

* * * * *